(12) United States Patent
Chipko et al.

(10) Patent No.: US 11,415,380 B2
(45) Date of Patent: Aug. 16, 2022

(54) HEAT EXCHANGERS, HEAT EXCHANGER TUBES, AND ADDITIVE MANUFACTURING COLD SPRAY PROCESSES FOR PRODUCING THE SAME

(71) Applicant: HONEYWELL INTERNATIONAL INC., Morris Plains, NJ (US)

(72) Inventors: Paul Chipko, Blairstown, NJ (US); James Piascik, Randolph, NJ (US); Bahram Jadidian, Watchung, NJ (US); Harry Lester Kington, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1 day.

(21) Appl. No.: 16/877,904

(22) Filed: May 19, 2020

(65) Prior Publication Data

US 2020/0278160 A1 Sep. 3, 2020

Related U.S. Application Data

(62) Division of application No. 15/882,160, filed on Jan. 29, 2018, now Pat. No. 10,704,845.

(51) Int. Cl.
*B22F 5/10* (2006.01)
*B33Y 10/00* (2015.01)
(Continued)

(52) U.S. Cl.
CPC ............ *F28F 19/06* (2013.01); *B21C 23/085* (2013.01); *B21C 37/0807* (2013.01); *B22F 5/10* (2013.01); *B22F 7/008* (2013.01); *B33Y 10/00* (2014.12); *B33Y 80/00* (2014.12); *C23C 4/00* (2013.01); *C23C 24/04* (2013.01); *F28F 21/084* (2013.01);
(Continued)

(58) Field of Classification Search
None
See application file for complete search history.

(56) References Cited

U.S. PATENT DOCUMENTS 4,687,510 A * 8/1987 Cheney ............... B22F 9/10
264/12
6,138,747 A 10/2000 Kroger et al.
(Continued)

FOREIGN PATENT DOCUMENTS

CN 102925888 A 2/2013

OTHER PUBLICATIONS

Chen Zhen-Hu, et al.; Application of a novel multilayer spray forming technology in the preparation of large dimension aluminium alloy blanks; Journal of Central South University of Technology, Dec. 2000, vol. 7, Issue 4, pp. 201-204.
(Continued)

*Primary Examiner* — Anthony M Liang
(74) *Attorney, Agent, or Firm* — Lorenz & Kopf, LLP

(57) ABSTRACT

Methods are disclosed for fabricating heat exchangers and Heat Exchanger (HX) tubes, as are heat exchangers fabricated in accordance with such methods. In embodiments, the method includes fabricating an HX tube by at least partially forming the elongated tube body utilizing a cold spray process during which a metallic feedstock powder is deposited over a removable mandrel. The HX tube is separated from the removable mandrel at some juncture following cold spray deposition of the tube body.

11 Claims, 7 Drawing Sheets

(51) Int. Cl.
*F28F 19/06* (2006.01)
*B21C 37/08* (2006.01)
*B22F 7/00* (2006.01)
*F28F 21/08* (2006.01)
*B21C 23/08* (2006.01)
*C23C 4/00* (2016.01)
*B33Y 80/00* (2015.01)
*C23C 24/04* (2006.01)

(52) U.S. Cl.
CPC ..... *B22F 2301/052* (2013.01); *B22F 2998/10* (2013.01); *B22F 2999/00* (2013.01)

(56) References Cited

U.S. PATENT DOCUMENTS

| | | | |
|---|---|---|---|
| 6,186,222 | B1 | 2/2001 | Doko et al. |
| 7,732,059 | B2 | 6/2010 | Ren et al. |
| 8,701,590 | B2 | 4/2014 | Kay et al. |
| 2006/0134320 | A1* | 6/2006 | DeBiccari ............... B23P 6/007 427/140 |
| 2006/0166020 | A1* | 7/2006 | Raybould ............... C23C 24/04 428/471 |
| 2006/0242831 | A1 | 11/2006 | Cesaroni |
| 2011/0223053 | A1 | 9/2011 | Jahedi et al. |
| 2013/0081748 | A1 | 4/2013 | Miller et al. |
| 2014/0069620 | A1 | 3/2014 | Takaswa et al. |
| 2014/0263853 | A1 | 9/2014 | Jackson et al. |
| 2014/0272459 | A1 | 9/2014 | Daugherty et al. |
| 2015/0369372 | A1* | 12/2015 | Hrdlichka ............... F02C 6/08 137/334 |
| 2016/0089750 | A1 | 3/2016 | Champagne, Jr. et al. |
| 2017/0120393 | A1 | 5/2017 | Lin et al. |
| 2018/0010216 | A1 | 1/2018 | Vo et al. |
| 2018/0320801 | A1 | 11/2018 | Yang et al. |
| 2018/0328673 | A1 | 11/2018 | Stoia et al. |
| 2019/0033020 | A1 | 1/2019 | Twelves, Jr. et al. |

OTHER PUBLICATIONS

Laklanli, A., et al.; Effect of spraying rate on microstructure of spray deposited Al—Fe—V—Si alloy; The Institute of Materials, Minerals and Mining; Journal Powder Metallurgy, vol. 46, 2003—Issue 4.

Zhao, L., et al; Deposition of aluminium alloyAl12Si by cold spraying; Retrieved from Internet [http://cat.inist.fr/?aModele=afficheN&cpsidt=17722561] Oct. 10, 2017.

Ajdelsztajn, L., et al.; Cold Spray Deposition of Nanocrystalline Aluminum Alloys; Metallurgical and Materials Transactions A, vol. 36A, Mar. 2005.

Zhang, RH et al; Research on the Microstructure and Mechanical Properties of Spray-Deposited 8009 Heat Resistant Aluminum Alloy; Retrieved from Internet [https://www.scientific.net/AMM.543-547.3733] Oct. 10, 2017.

Mondoux, J.; Development of a cold-gas dynamic spraying system for parameter study of aluminium coatings; Retrieved from Internet [https://ruor.uottawa.ca/handle/10393/26719] Oct. 10, 2017.

Cavaliere, P., et al.; Crack Repair in Aerospace Aluminum Alloy Panels by Cold Spray; Submitted: Jul. 4, 2016 / in revised form: Jan. 15, 2017 / Published online: Feb. 7, 2017 ASM International 2017.

* cited by examiner

HEAT EXCHANGERS, HEAT EXCHANGER TUBES, AND ADDITIVE MANUFACTURING COLD SPRAY PROCESSES FOR PRODUCING THE SAME

CROSS-REFERENCE TO RELATED APPLICATION

This application is a divisional of U.S. patent application Ser. No. 15/882,160 filed on Jan. 29, 2018. The relevant disclosure of the above application is incorporated herein by reference.

TECHNICAL FIELD

The present disclosure relates generally to heat exchangers and, more particularly, to heat exchangers, heat exchanger tubes, and cold spray additive manufacturing processes for fabricating the same.

ABBREVIATIONS

Abbreviations appearing less frequently in this document are defined upon initial usage, while abbreviations appearing with greater frequency are defined below.
Al—Aluminum;
AM—Additive Manufacturing:
HX tube—Heat Exchanger tube;
NEA—Non-Equilibrium Alloy;
Wt %—Weight percent;
° C.—degrees Celsius; and
° C./s—degrees Celsius per second.

BACKGROUND

Heat exchangers are commonly utilized to promote heat transfer from a first fluid (herein, a "temperature-regulated fluid") to a second fluid (herein, a "heat-receiving medium"). Depending upon design, heat exchangers often contain multiple elongated, thin-walled HX tubes through which the temperature-regulated fluid is circulated during heat exchanger operation. Such heat exchangers are referred to herein as "tube-containing heat exchangers" and include radiators, shell-and-tube heat exchangers, double pipe heat exchangers, and others. As the temperature-regulated fluid flows through the HX tubes, heat is transferred from the temperature-regulated fluid to the HX tubes, thermally conducted through the tube walls, and ultimately transferred to a heat-receiving medium in contact with the tube exteriors. The heat-receiving medium may be ambient gasses when the heat exchanger assumes the form of a radiator, in which case heat removal may be promoted by impinging airflow against the tube exteriors. Alternatively, in the case of a shell-and-tube heat exchanger, heat extracted from the temperature-regulated fluid may be transferred to the heat-receiving medium in the form of a second fluid (liquid or gas) circulated through the heat exchanger.

In a tube-containing heat exchanger, the physical characteristics of the HX tubes may be impactful on the thermal performance, size, weight, shape, and temperature tolerances of the heat exchanger. HX tube thickness and composition, in particular, may be at least partially determinative of the overall weight and thermal performance characteristics of the heat exchanger, particularly when containing a relatively large number of elongated HX tubes. When deployed onboard an aircraft or other vehicle, the HX tubes are ideally composed of a material possessing a relatively high thermal conductivity to maximize thermal transfer, while further having a relatively low density to minimize weight. Lightweight, Al-based alloys are often selected for HX tube fabrication for these reasons. As conventionally formulated and fabricated, however, HX tubes composed of Al-based materials remain undesirably heavy for airborne usage and other specialized applications. Moreover, the thermal tolerances of Al-based HX tubes can be undesirably limiting in at least some instances; e.g., conventional Al-based HX tubes may be unsuitable for prolonged exposure to temperatures approaching or exceeding 350° C., as may be unduly restrictive in certain high temperature applications.

There thus exists an ongoing demand in the aerospace industry and elsewhere for the development of high performance, tube-containing heat exchangers having enhanced temperature tolerances, lightweight constructions, and other desirable physical characteristics, such as enhanced oxidation and corrosion resistance. Ideally, embodiments of such tube-containing heat exchangers, and particularly the HX tubes contained therein, would be amenable to fabrication utilizing relatively low cost, efficient manufacturing processes affording a high level of flexibility in heat exchanger design. Other desirable features and characteristics of embodiments of the present invention will become apparent from the subsequent Detailed Description and the appended Claims, taken in conjunction with the accompanying drawings and the foregoing Background.

BRIEF SUMMARY

Methods are disclosed for fabricating heat exchangers including HX tubes, which are at least partially fabricated from NEA feedstock powders or other powdered alloys utilizing AM cold spray manufacturing processes. In various embodiments, the method includes the steps or processes of obtaining a NEA feedstock powder comprised of an alloy matrix throughout which at least one minority constituent is dispersed. Due to the metastable nature of the NEA material, the first minority constituent precipitates from the alloy matrix when the NEA feedstock powder is exposed to temperatures exceeding a critical temperature threshold ($T_{CRITICAL}$) for a predetermined time period, which may be on the order of a few seconds. In embodiments of the heat exchanger fabrication method, a cold spray process is carried-out to form or build-up the HX tubes, whether in whole or in part, from the NEA feedstock powder. The HX tubes are then installed in the heat exchanger proper by, for example, joining the HX tubes to a manifold plate, a tubesheet, or other header structure. The method is performed such that: (i) the HX tubes are exposed to a maximum temperature ($T_{SPRAY\_MAX}$) during the cold spray process, and (ii) $T_{SPRAY\_MAX}$ is maintained below $T_{CRITICAL}$ to substantially preserve the non-equilibrium state of the NEA feedstock powder through the cold spray process.

Methods for producing HX tubes, which have elongated tube bodies, are further provided. In implementations, the method includes the steps or processes of fabricating an HX tube by at least partially forming the elongated tube body utilizing a cold spray process during which a metallic feedstock powder is deposited over a removable mandrel. The HX tube is separated from the removable mandrel at some juncture following cold spray deposition of the tube body. In embodiments, the method may further include selecting the metallic feedstock powder to contain a NEA feedstock powder, which is predominately composed of Al, Ni, or a combination thereof by wt %. In such embodiments, the NEA feedstock powder may be composed an alloy matrix throughout which a first minority constituent or dispersoid is dispersed, with the first minority constituent precipitating from the alloy matrix when the NEA feedstock powder is exposed to temperatures exceeding a critical temperature threshold ($T_{CRITICAL}$) for a predetermined time period. Further, the cold spray process may be performed such that: (i) the HX tubes are exposed to a maximum temperature ($T_{SPRAY\_MAX}$) during the cold spray process, and (ii) $T_{SPRAY\_MAX}$ is maintained below $T_{CRITICAL}$ to substantially preserve the non-equilibrium state of the NEA feedstock powder through cold spray deposition.

Embodiments of a heat exchanger are further provided. In one implementation, the heat exchanger contains a header structure, such as manifold plate or tubesheet, to which HX tubes are joined. The HX tubes are each at least partially composed of a spray-deposited NEA material, which contains an aluminum or nickel matrix throughout at least first minority constituent is dispersed. The first minority constituent is selected from the group consisting of iron and silicon in certain implementations of the heat exchanger. Joints may be formed around selected tube-header interfaces by, for example, depositing an alloy utilizing a cold spray process. The NEA material is conveniently, although non-essentially selected as the joint-forming alloy.

The foregoing summaries are provided by way of non-limiting example only. Various additional examples, aspects, and other features of embodiments of the present disclosure are described in more detail below.

BRIEF DESCRIPTION OF THE DRAWINGS

At least one example of the present invention will hereinafter be described in conjunction with the following figures, wherein like numerals denote like elements, and.

Figure 1:
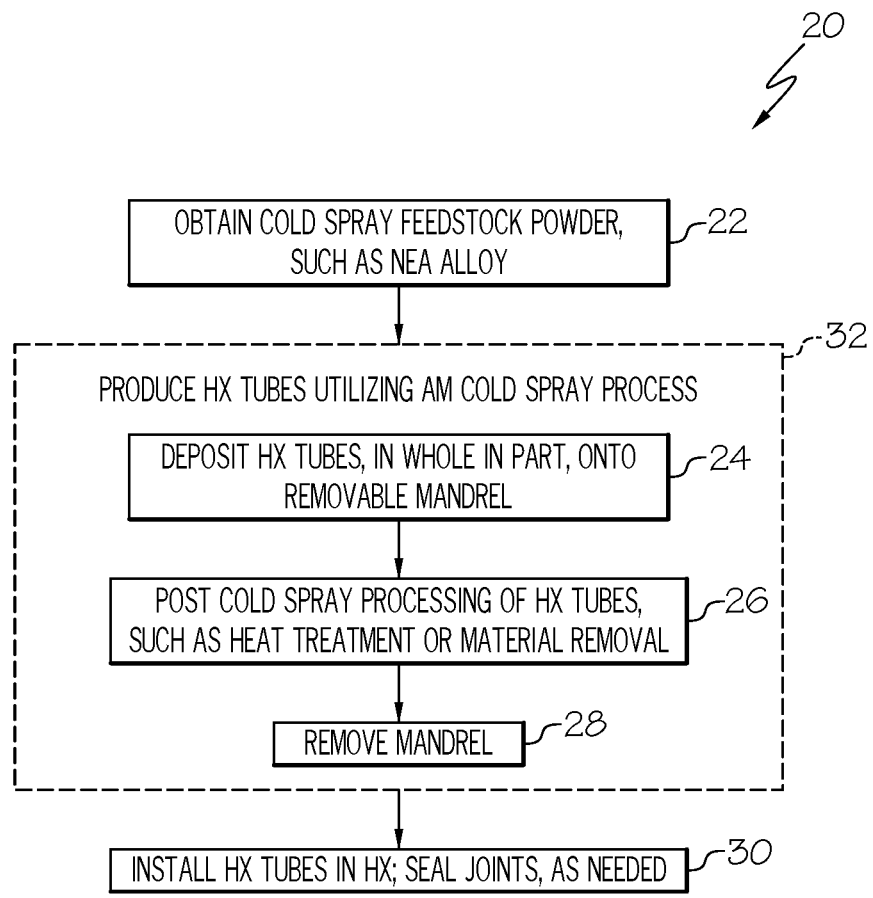
FIG. 1 is a flowchart of an exemplary method for fabricating heat exchangers including HX tubes, which are at least partially fabricated by cold spray-deposition of an NEA material or other alloy feedstock powder, as illustrated in accordance with an exemplary embodiment of the present disclosure.

For simplicity and clarity of illustration, descriptions and details of well-known features and techniques may be omitted to avoid unnecessarily obscuring the exemplary and non-limiting embodiments of the invention described in the subsequent Detailed Description. It should further be understood that features or elements appearing in the accompanying figures are not necessarily drawn to scale unless otherwise stated. For example, the dimensions of certain elements or regions in the figures may be exaggerated relative to other elements or regions to improve understanding of embodiments of the invention.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Definitions

As appearing herein, the term "alloy" refers to a material composed predominately or exclusively of metallic constituents by weight percent (wt %). As further appearing herein, a "non-equilibrium alloy" or "NEA" is defined as a material containing an alloy matrix throughout which one or more minority constituents (metallic or non-metallic constituents present in quantities less than that of the alloy matrix, by wt %) are distributed. Further, the minority constitution(s) or dispersoid(s) exhibit a tendency or propensity, as predicted by established thermodynamic principles, to precipitate from the matrix and agglomerate should the NEA material be heated above a critical temperature threshold (herein, "$T_{CRITICAL}$") for an extended period of time on the order of, for example, several seconds. Thus, in essence, NEA materials exist in desired metastable states; and, if heated to excessive temperatures, the NEA materials experience precipitate growth detracting from the overall strength, ductility, and, perhaps, other desirable properties of the material. The value of $T_{CRITICAL}$ will vary amongst embodiments depending upon alloy composition, but will generally be less than the melt point of the NEA material and, more specifically, the alloy matrix (herein, "$T_{ALLOY\_MP}$"). In certain embodiments, $T_{CRITICAL}$ will range from about 350° C. to about 500° C. or, perhaps, from about 400° C. to about 450° C. In other embodiments, $T_{CRITICAL}$ may be greater than or less than the aforementioned range.

INCORPORATION BY REFERENCE

Further discussion of NEA materials can be found in the following application, which is owned by the present assignee at the time of filing this document with the United States Patent and Trademark Office (USPTO) and which is incorporated by reference: U.S. patent application Ser. No. 15/827,339, entitled "NON-EQUILIBRIUM ALLOY COLD SPRAY FEEDSTOCK POWDERS, MANUFACTURING PROCESSES UTILIZING THE SAME, AND ARTICLES PRODUCED THEREBY," filed with the USPTO on Nov. 30, 2017.

Overview

Methods for fabricating HX tubes utilizing AM cold spray processes are provided, as are methods for manufacturing heat exchangers generally. The AM cold spray processes described herein are well-suited for fabricating HX tubes, in whole or in substantial part, from powdered alloys including NEA feedstock powders. The usage of NEA feedstock powders can improve heat exchanger temperature capabilities and other properties when tailored to contain desired metastable microstructures, providing that such microstructures are adequately preserved through subsequent processing stages. Regardless of whether produced from an NEA feedstock powder or another feedstock powder, an AM cold spray process is utilized to build-up the HX tubes during the heat exchanger fabrication process. In one approach, the elongated bodies of the HX tubes are formed by cold spray deposition of the NEA feedstock powder or other alloy powder onto a removable mandrel. The AM cold spray process is controlled to deposit the HX tube bodies to desired wall thicknesses, which may or may not vary along the length of the tube body. Following the cold spray deposition process, the HX tubes are separated from the mandrel. In embodiments, mandrel removal may be eased by providing a low friction release coating on the mandrel, such as a plated metal layer containing co-deposited solid film lubricant particles. Various other approaches can be utilized to facilitate mandrel removal including, but not limited to, chemical dissolution of the mandrel body or a sacrificial outer layer present thereon, heating or cooling to exploit disparities in Coefficient of Thermal Expansion (CTE) between the HX tubes and mandrels, breaking of mandrels when composed of a frangible material, physical collapse or deflation of the mandrel, and the usage of pressurized fluid (liquid or gas) to urge mandrel separation.

The cold spray-deposited HX tubes can be fabricated to have any desired cross-sectional geometry, which may or may not vary along the tube length. Such cross-sectional geometries include circular, ovular, and polygonal shapes, the latter of which may favorably increase packing density in the completed heat exchanger. In certain cases, one or both terminal end portions of a given HX tube may be imparted with tapered or stepped thicknesses. In this regard, the wall thicknesses of a given HX tube may increase when moving toward the terminal ends thereof to reduce Thermal Mechanical Fatigue (TMF) during heat exchanger operation. Additionally or alternatively, a given HX tube may be fabricated to include thin-walled sections at one or both of its terminal ends for subsequent deformation (e.g., via crimping or roll expansion) for mechanical locking and/or sealing purposes during assembly. This may be particularly beneficial when the HX tubes are produced from an NEA material and joints are desirably formed at the interfaces between the tube ends and surrounding heat exchanger infrastructure without exposing the NEA material to peak processing temperatures exceeding $T_{CRITICAL}$. In yet other implementations, the cold spray deposition process may be further leveraged to form the desired joints via local deposition of a suitable powdered alloy, such the NEA material from which the tube bodies are composed. Other assembly approaches are also possible including the spray-deposition of the HX tube bodies onto end members composed of a non-NEA material, which is amenable to welding, brazing, or a similar high temperature joint formation processes. An exemplary method for fabricating HX tubes and tube-containing heat exchangers, generally, will now be described in conjunction with FIG. 1.

Example of Process for Fabricating Heat Exchanger Tubes and Heat Exchangers Generally Turning now to FIG. 1, a method 20 for fabricating tube-containing heat exchangers is set-forth in conjunction with an exemplary embodiment of the present disclosure. As depicted, method 20 includes a number of sequentially-performed process steps identified as STEPS 22, 24, 26, 28, 30, with STEPS 24, 24, 26 carried-out as part of an overarching sub-process 32 (herein, "PROCESS BLOCK 32") for fabricating HX tubes. The steps illustrated in FIG. 1 and described below are provided by way of non-limiting example only. In alternative embodiments, additional process steps may be performed, certain steps may be omitted, and the illustrated steps may be performed in alternative sequences. In certain implementations of method 20, a first entity may perform only those steps in PROCESS BLOCK 32 to produce HX tubes from an NEA feedstock powder or other material. One or more additional entities may then perform those steps related to integration of the HX tubes into the completed heat exchanger.

Method 20 commences with obtaining the feedstock powder for usage in the subsequently-performed AM cold spray process (STEP 22). During STEP 22, the selected feedstock powder may be purchased from a third party supplier or obtained via independent production; that is, production by the same entity performing those steps set-out in PROCESS BLOCK 32 of method 20. As indicated above, embodiments of the HX tubes are usefully fabricated from certain metastable alloys referred to as "NEA materials," although this is not essential in all implementations of method 20. For completeness, a brief description of various process by which NEA feedstock powders can be produced will now be provided. The following description is offered by way of non-limiting illustration only, however, with the understanding that the HX tubes can be at least partly, if not wholly fabricated from non-NEA feedstock powders suitable for cold spray deposition in further embodiments of the present disclosure.

NEA feedstock powders, which are of the type beneficially utilized to form the HX tubes during the below-described AM cold spray process, can be produced utilizing the following process steps in embodiments. The following steps are also generally discussed in the co-pending Application identified above and incorporated by reference. To commence an exemplary NEA feedstock powder production process, a molten source material is first converted into a desired solid form utilizing a rapid cooling casting process. As appearing herein, a casting process is considered "rapid cooling" when achieving an molten alloy cooling rate equal to or greater than $1\times10^{6\circ}$ C./s. Notably, this cooling rate exceeds those achievable utilizing many conventional processes including atomization processes of the type traditionally employed to produce cold spray feedstock powders. Indeed, such atomization processes often achieve, at most, cooling rates approximately ten times less efficient than the above-mentioned threshold; e.g., cooling rates equal to or less than approximately $1\times10^{5\circ}$ C./s. Such cooling rates are also approximately one hundred or more times less rapid than the below-described planar flow casting process, which is advantageously utilized to produce bulk NEA material in embodiments.

Figure 2:
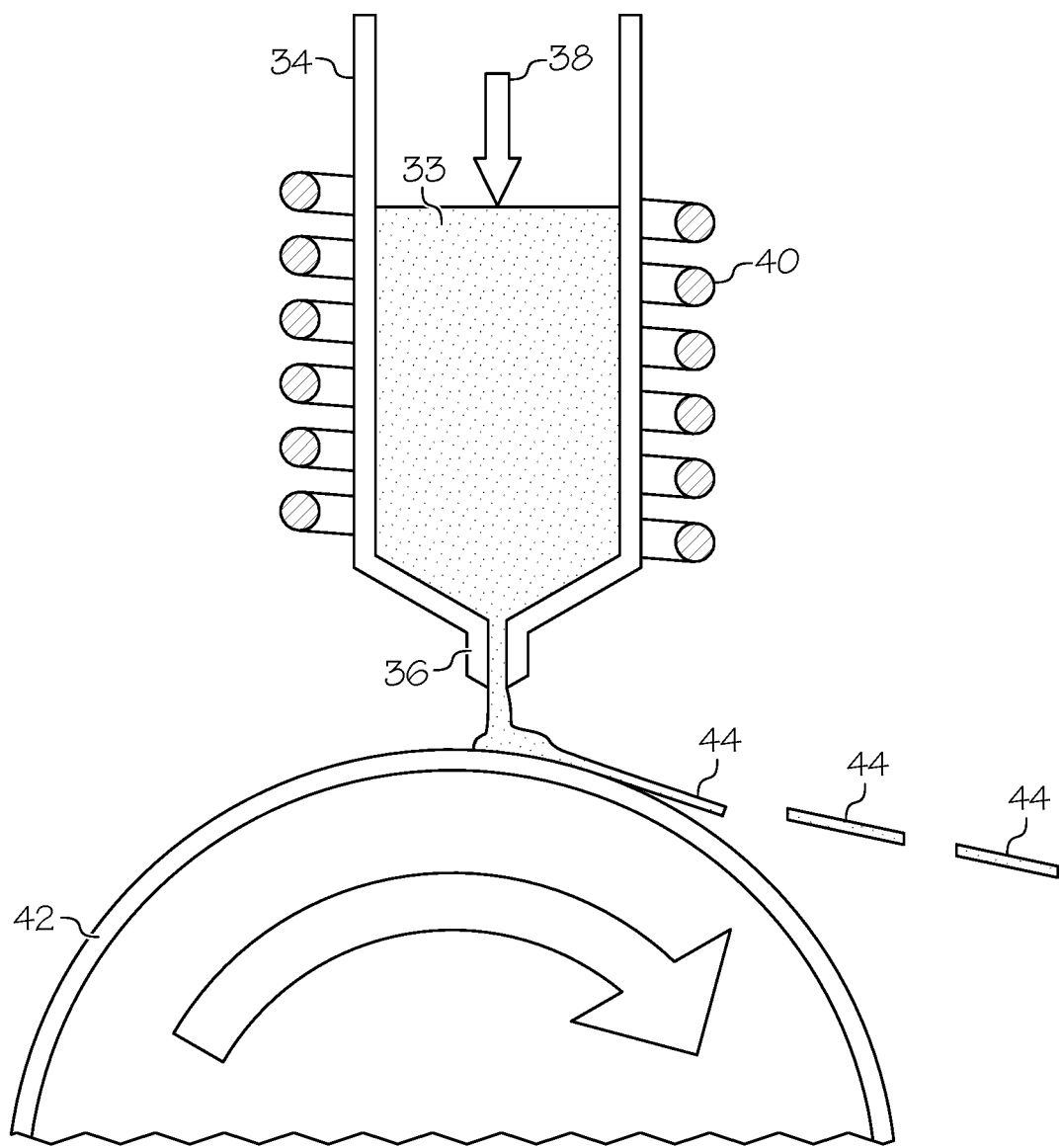
FIG. 2 is a schematic illustrating an exemplary planar flow casting process suitable for producing a solid NEA body or bulk shape (here, an NEA ribbon), which may be further processed into a NEA feedstock powder suitable for usage in implementations of the method set-forth in FIG. 1.

In one potential approach, molten source material is formed into a desired solid shape utilizing a planar flow casting process (also referred to as a "melt-spin process"). An example of such a planar flow casting process is schematically illustrated in FIG. 2. Referring briefly to this drawing figure, a molten source material 33 is contained within a crucible 34 having a lower nozzle 36. The flow of molten source material 33 through nozzle 36 is regulated via the application of a controlled internal pressure, as represented by arrow 38. This internal pressure can be mechanically applied by, for example, a plunger; or applied utilizing pressurized gas, such air or argon (Ar). The source material is maintained in a molten state utilizing a controllable heat input, such as one or more laser or electron beams. Alternatively, as indicated in FIG. 2, the desired heat input can be generated utilizing at least one induction coil 40, which is positioned around crucible 34. When appropriately energized, induction coil 40 generates a variable magnetic field driving inductive heating within molten source material 33 (if having a sufficient iron (Fe) content or otherwise composed of a ferromagnetic material) and/or within a structure contacting or otherwise in thermal communication with source material 33; e.g., if composed of a ferromagnetic material, the walls of crucible 34 may be inductively heated when immersed in the variable magnetic field generated by induction coil 40. In certain instances, induction coil 40 may be controlled to regulate the temperature of molten source material 33, as desired, which may be monitored utilizing a non-illustrated temperature sensor.

Immediately following discharge through nozzle 36, molten source material 33 contacts a rotating wheel 42, which may be cooled by active water flow or in another manner. Contacting the outer periphery of wheel 42, molten source material 33 rapidly cools, solidifies, and is rapidly cast from wheel 42 to form a bulk NEA shape, such as a melt-spun ribbon 44. The appearance and dimensions of melt-spun ribbon 44 will vary amongst embodiments; however, in many cases, melt-spun ribbon 44 may assume the form of a metallic foil and have a thickness ranging from about 0.5 to about 5 millimeters (mm) and, perhaps, from about 1 and about 2 mm. The width of ribbon 44 is somewhat arbitrary, but may range from about 10 to about 100 mm in an embodiment. In other embodiments, the thickness and/or width of ribbon 44 may vary with respect to the aforementioned ranges. The temperatures to which molten source material 33 is heated and the rotational rate of wheel 42 will vary amongst embodiments of the planar flow casting process; however, by way of example, source material 33 may be heated to temperatures approaching or exceeding 1000° C. in certain implementations, while wheel 42 may be rotated at a rate sufficient to cast-off ribbon 44 at a rate greater than approximately 300 meters per second. Due to the relative thinness of ribbon 44, the cooled state of rotating wheel 42, and the manner in which ribbon 44 is rapidly ejected from wheel 42, exceptionally high cooling rates are achieved. Such cooling rates can approach or exceed approximately $1 \times 10^{7°}$ C./s in many instances, thereby enabling the formation of ribbon 44 as an NEA material having a desired metastable microstructure.

By virtue of the formulation of molten source material 33 and the rapid solidification thereof, melt-spun ribbon 44 is composed of an NEA material existing in a metastable state and possessing a desired microstructure. The particular composition of the NEA material will vary amongst embodiments, as will the shape of the initially-produced bulk NEA material (here, melt-spun ribbon 44). By definition, the NEA material contains at least one minority constituent or dispersoid (as defined by wt %) having a propensity, as predicted by established thermodynamic principals, to precipitate from the alloy matrix (as formed by the majority metallic constituent(s) of the NEA material) when the NEA material is heated above its particular critical temperature threshold ($T_{CRITICAL}$) for an extended time period; the term "extended" utilized in a relative sense, noting that a time period of several seconds may be considered "extended" in certain instances. In many cases, the NEA material will contain multiple minority constituents or dispersoids (e.g., silicides or carbides) distributed throughout the alloy matrix and prone to participate growth or agglomeration when subjected to such overtemperature conditions.

For the purposes of explanation, the following describes the NEA materials beneficially utilized to form HX tubes principally as Ni-based or Al-based NEA materials; that is, NEA materials containing Ni or Al as their predominate constituent by wt %, respectively. Such Ni-based and Al-based NEA materials can be formulated to provide highly stable microstructure at elevated operating temperatures; e.g., temperatures exceeding 350° C. and, in some instances, at temperatures approaching or exceeding 425° C. Considering this, and further considering the relatively low densities of such NEA materials, the present inventors have identified certain Ni-based and Al-based NEA materials as ideal candidates for usage in the production of heat exchanger components and, particularly, the elongated bodies of HX tubes. For this reason, certain portions of the following description may describe the HX tubes as fabricated from such NEA materials. This notwithstanding, the HX tubes can be produced from NEA materials having other formulations in alternative embodiments. More generally, and as noted above, the HX tubes can be fabricated from non-NEA cold spray feedstock materials in further implementations of method 20 (FIG. 1).

In one group of embodiments, molten source material 33 and melt-spun ribbon 44 are composed of an Al-based NEA material. The Al-based NEA material may further contain lesser amounts of other metallic constituents, such as Fe, and/or other non-metallic constituents, such as silicon (Si), which precipitate from the Al-matrix if exposed to overtemperatures conditions. In this case, the Fe content may gradually precipitate from the Al-matrix and form undesired phases, such as $Fe_3Al$, within the NEA material. So too may the Si precipitate from the Al-matrix and contribute to needle-like dendritic growth within the Al-matrix. Once formed, such undesirable phases tend to grow or agglomerate and therefore worsen over time. In various embodiments, the Al-based NEA feedstock powder may contain between 85 wt % and 90 wt % Al, between 8 and 10 wt % Fe, between 1 wt % and 3 wt % Si, between 1 wt % and 2 wt % vanadium (V), and lesser amounts of other metallic or non-metallic constituents, such as oxygen (O), zinc (Zn), titanium (Ti), chromium (Cr), and/or manganese (Mn). In such embodiments, $T_{ALLOY\_MP}$ may exceed $T_{CRITICAL}$ by at least 100° C.; e.g., $T_{ALLOY\_MP}$ may range from about 600° C. to about 700° C., while $T_{CRITICAL}$ may range from about 400° C. to about 450° C. In one specific implementation, the Al-based NEA feedstock powder is composed, in whole or in substantial part, of an AA8009 aluminum alloy powder. In further embodiments, the NEA feedstock powder may be predominately composed of an Al-based alloy or a Ni-based alloy throughout which silicides, carbides, and/or other dispersoid strengtheners are distributed.

With continued reference to FIGS. 1-2, the newly-produced solid NEA body or bulk shape (e.g., melt-spun ribbon 44) is next mechanically processed or converted into feedstock powder of a desired particulate shape and size range. A non-exhaustive list of particle shapes includes rod, whisker, platelet or laminae, oblong, and spherical shapes. To the extent practical, particle shape may be tailored for relatively low aerodynamic drag to optimize velocity and provide a substantially linear trajectory during the subsequent AM cold spray process carried-out during STEP 26 of method 20. In many instances, particle shape will be at least partially determined by the constraints of the mechanical processing techniques utilized to breakup the solid NEA body or bulk shape. For example, when melt-spun ribbon 44 is mechanically processed into smaller pieces utilizing chopping, grinding, and/or milling processes, the resulting pieces or particles will often have a platelet or flake-like form. The desired particle size range of the NEA feedstock powder will also vary amongst embodiments and may be selected based upon a number of competing criteria. Such competing criteria may include the parameters of the AM cold spray process, the capabilities of the cold spray apparatus utilized, and the general desirability of maximizing particle velocity during cold spraying, while reducing the propensity of the NEA feedstock material to explode and/or to rapidly oxidize during cold spraying.

Generally, as the average particle size decreases, the oxide content within the cold spray-deposited NEA body tend to rise due to an increase in the ratio of exposed surface area to volume of the powder particulates (when prone to oxidation). Conversely, as the average particle size decreases, explosivity tends to increase, while (somewhat counter-intuitively) particle velocities tend to decrease during the subsequently-performed cold spray process. To balance such competing interests, the bulk NEA body (e.g., melt-spun ribbon 44) may be converted into a powder form that predominately or, perhaps, substantially exclusively containing's particles ranging in size from about 10 microns (μm) to about 140 μm and, preferably, from about 20 μm to about 90 μm in maximum dimension (e.g., diameter or length, depending upon particle shape). The terms "predominately" or "substantially exclusively" are utilized here as an acknowledgement that, in embodiments, a relatively minor amount of smaller particles will often remain within the NEA feedstock powder as such small particles may be difficult to sieve or otherwise completely remove due to electrostatic attraction to the larger particles within the powder. Accordingly, in one implementation, the NEA feedstock powder may contain or consist substantially entirely of flake-shaped particles ranging from about 5 μm to about 90 μm and, more preferably, about 10 μm to about 45 μm in maximum dimension. In other embodiments, the NEA feedstock powder can possess different geometries and dimensions; and/or may be mixed with other powders or media to form the powder mixtures utilized during the below-described AM cold spray process.

Various different mechanical processing steps can be employed to convert melt-spun ribbon 44 (FIG. 2) into a NEA feedstock powder having the desired particle shape and size range. As indicated above, mechanical processing steps for converting large pieces of material into smaller pieces of material include chopping, milling, grinding, and combinations thereof. Processes for selecting a desired particle size range include sieving, cyclonic separation, and the like. In one approach, melt-spun ribbon 44 (FIG. 2) is first converted into flake-like pieces utilizing a dry or wet chopping process. Sieving is then performed to remove undesirably large pieces or "overs" of the NEA material. Afterwards, one or more milling processes may be carried-out to further reduce the size of the flake-like pieces thereby bringing the particles into conformance with the desired sized range. In one approach, a two stage milling process is carried-out with hammer milling first performed, followed by attrition milling. Attrition milling is generally performed with an attritor unit, which utilizes a rod to aggressively stir the NEA material along with a milling media, such as steel spheres. The milling processes can be carried-out in either a wet or dry state. Notably, such a two sage milling process (particularly when involving attrition milling) has been found to produce significantly higher yields than other milling process, such as a ball milling. After attrition milling, additional grinding steps and/or particle size selection steps can be performed, as needed. Furthermore, in certain cases, additional steps may be performed for particle-shaping purposes; e.g., to round the flake-like particles into more spherical shapes to decrease aerodynamic drag and instabilities during the subsequently-performed AM cold spray process.

In embodiments, heat treatment may now be carried-out to anneal the NEA feedstock powder. Such an annealing process (herein, a "pre-spray anneal") is usefully performed to relieve material stress and any work hardening resulting from the above-described mechanical processing steps. When performed, the pre-spray anneal may be carried-out in accordance with a pre-established heating schedule specific to the NEA material being processed. Generally, pre-spray annealing will entail heating the NEA feedstock powder to a maximum anneal temperature ($T_{ANNEAL\_MAX}$) for a predetermined period of time on the order of, for example, approximately one hour. The pre-spray annealing process is controlled such that $T_{ANNEAL\_MAX}$ is less than $T_{CRITICAL}$ throughout the annealing process. For example, in one embodiment in which $T_{CRITICAL}$ ranges from 400° C. to 450° C., $T_{ANNEAL\_MAX}$ may range from 350° C. to 400° C. In another embodiment, $T_{ANNEAL\_MAX}$ may range between a minimum of $T_{CRITICAL}$ minus about 150° C. to a maximum of $T_{CRITICAL}$ minus about 25° C. or, perhaps, between a minimum of $T_{CRITICAL}$ minus about 100° C. to a maximum of $T_{CRITICAL}$ minus about 50° C. By relieving materials stresses and possibly reducing work hardening (particularly in the case of feedstock powders prone to work hardening, such as Al-based NEA feedstock powders), the resulting NEA feedstock powder may be rendered more malleable to enhance adhesion and compaction during the subsequently-performed AM cold spray process. These benefits notwithstanding, the NEA feedstock powder need not be subject to pre-spray annealing in alternative embodiments of method 20.

With continued reference to FIG. 1, method 20 next advances to PROCESS BLOCK 32 during which the HX tubes are fabricated utilizing an AM cold spray process. Build-up of the HX tubes during cold spraying can be performed in different manners. In certain implementations, the AM cold spray process may be utilized to deposit or three dimensionally print the HX tubes in a lengthwise direction without the usage of a mandrel, when the structural integrity of the selected cold spray feedstock material and tube wall thickness permit. Such an approach may provide greater flexibility in tube geometry and is usefully employed when the HX tubes are desirably produced to have non-linear geometries, such as undulating or U-shaped geometries, as taken along their respective lengths. If desired, specialized nozzles may be utilized to impart the HX tubes with a desired cross-sectional shape. In other embodiments, the cold spray process may involve depiction of the NEA powder or other selected cold spray feedstock over a temporary substrate, tooling structure, or removable mandrel. As described below, the usage of removable mandrels may help expedite the cold spray deposition process and aid in depositing the HX tubes to have thin-walled geometries thereby the overall enhancing thermal performance and reducing weight of the resulting heat exchanger.

Figure 3:
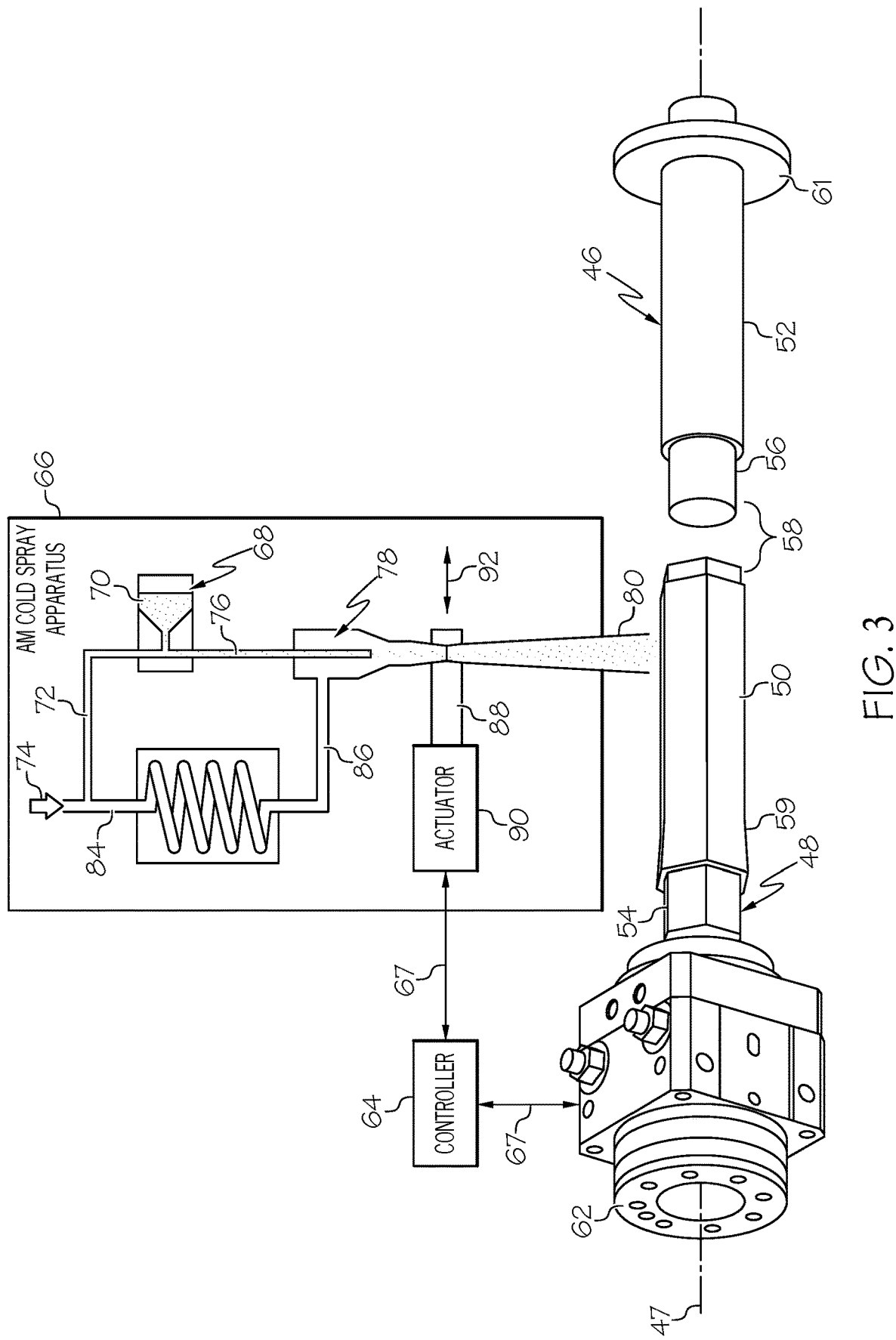
FIG. 3 schematically illustrates an exemplary AM cold spray process during which an elongated HX tube is spray-deposited over a removable mandrel in an implementation of the method of FIG. 1.

FIG. 3 schematically illustrates an exemplary AM cold spray process during which an HX tube 46 is compiled over a removable mandrel 48, as may be carried-out in during STEP 24 of method 20 in an exemplary embodiment. In this drawing figure, opposing end portions 50, 52 of HX tube 46 and opposing end portions 54, 56 of removable mandrel 48 are illustrated, while the intermediate portions of HX tube 46 and removable mandrel 48 are hidden from view. An axial gap 58 is further shown in FIG. 3 to visually denote the omission of central portions of HX tube 46 and removable mandrel 48. HX tube 46 and removable mandrel 48 can be produced to have any practical length, as appropriate, to best suit a particular application or design. Further, in embodiments, multiple HX tubes 46 may be deposited as a continuous structure (that is, integrally joined in an end-to-end or linearly-connected manner) over a relatively lengthy mandrel 48, and subsequently separated into discrete pieces or individual units by singulation (e.g., mechanical sawing, water jetting, laser cutting, etching, or the like) following the cold spray process carried-out during PROCESS BLOCK 32 of method 20.

HX tube 46 can be imparted with a desired shape utilizing multiple techniques. When deposited onto a removable mandrel, such as mandrel 48 shown in FIG. 3, the outer geometry of mandrel 48 is generally transferred to the tube body. Additionally, relative movement of nozzle 80 and mandrel 48 can be controlled through the AM cold spray process to build-up selected regions of HX tube 46 to greater or lesser thicknesses, as specified by design. In this manner, different regions of HX tube 46 can be imparted with tapered wall thicknesses, integrally-formed flanges, and various other structural features. Further, in certain cases, the general cross-sectional shape of HX tube 46 may vary along its length. This possibility is indicated in FIG. 3, with tube end portion 52 imparted with a circular cross-sectional shape, as taken in a section plane orthogonal to longitudinal axis 47. Comparatively, end portion 50 of HX tube 46 is imparted with a polygonal cross-sectional geometry by virtue of the transfer of the polygonal cross-sectional shape of mandrel end portion 54 to end portion 50. Specifically, tube end portion 50 is imparted with a hexagonal cross-sectional geometry in the illustrated example, which may enhance packing density when HX tube 46 is assembled into a heat exchanger within a closely-spaced array of like tubes. In other embodiments, tube end portion 50 and, more generally, HX tube 46 as a whole may be imparted with another polygonal shape as tailored to suit a particular application or usage; e.g., HX tube 46 can be imparted with a diamond polygonal shape in further instances to, for example, reduce flow turbulence and pressure drop across the tube array. In alternative embodiments, removable mandrel 48 may have other external geometries, as appropriate, to impart HX tube 46 with a desired cross-sectional shape and dimensions to improve cross-flow of the heat-receiving medium (when applicable), to maximize the ratio of fluid-exposed surface area-to-volume for increased heat transfer efficiencies, or to fine tune other parameters.

As indicated above, one or both terminal end portions of HX tube 46 may be beneficially imparted with a tapered or stepped thickness in embodiments of method 20. This possibility is further illustrated in FIG. 3 for tube end portion 50, which has been deposited to have a thickness-tapered end region 59. As can be seen, thickness-tapered end region 59 gradually increases in wall thickness when moving along axis 47 from a central portion of HX tube 46 toward the terminal edge of end portion 50 (to the left in FIG. 3). Such a tapered thickening of tube end portion 50 may help relieve TMF during HX operation at the HX tube-header interface, as discussed below in connection with FIGS. 7-10. If desired, other structural features can also be formed at tube end portions 50, 52 to facilitate heat exchanger assembly or for other reasons. For example, as further indicated in FIG. 3 for tube end portion 52, the elongated body of HX tube 46 can be spray-deposited onto a prefabricated structure or end member, such as a radial flange 61, composed of a non-NEA material. This may be useful when the elongated body of HX tube 46 is composed of an NEA material for which heat input is desirably limited through fabrication and heat exchanger assembly to preserve the desired metastable microstructure of the NEA material. By forming HX tube 46 to include non-NEA radial flange 61, radial flange 61 can be subjected to higher peak temperatures during the joint formation, such as brazing or welding, while shielding the elongated body of HX tube 46 from peak temperatures that may otherwise degrade the NEA material microstructure.

During cold spray deposition, cold spray gun 78 and nozzle 80 may be moved relative to removable mandrel 48, while mandrel 48 remains spatially fixed or stationary in three dimensional space. Alternatively, in another approach, removable mandrel 48 may be intermittently or continuously turned about a rotational axis 60, which is coaxial with the longitudinal axis of mandrel 48 and HX tube 46. In this latter case, a motor 62 may drive rotation of HX tube 46, with a controller 64 adjusting the rotational rate or angular movement of the output shaft of motor 62, as needed. Controller 64 may also control operation of an AM cold spray apparatus 66 utilized to deposit the cold spray feedstock material over mandrel 48. Thus, as schematically shown in FIG. 3, controller 64 includes those components supporting the processing functionalities of apparatus 66. Accordingly, controller 64 can encompass or may be associated with any number of individual processors, computer-readable memories, power supplies, interface cards, and other standardized components. Controller 64 may also include or cooperate with any number of firmware and software programs or computer-readable instructions designed to carry-out the various process tasks, calculations, and control functions described herein. The data connections between controller 64, motor 62, and AM cold spray apparatus 66 are represented by arrows 67, which may be realized as wired or wireless connections.

In the generalized example of FIG. 3, AM cold spray apparatus 66 includes a feedstock powder supply 68, such as a hopper containing a feedstock powder 70. As discussed at length above, feedstock powder 70 is usefully, but non-essentially composed of an Al-based NEA alloy, an Ni-based NEA alloy, or another NEA alloy. A first flow line 72 connects a source of pressurized carrier gas (represented by arrow 74) to powder supply 68, while a second flow line 76 connects powder supply 68 to a cold spray gun 78. The carrier gas can be, for example, air, helium, nitrogen, or another gas. During operation of cold spray apparatus 66, pressurized gas supplied by gas source 74 is delivered to powder supply 68. Metered amounts of the feedstock powder are entrained in the gas stream, and the particle-entrained gas stream is then delivered to cold spray gun 78 for discharge through nozzle 80. If desired, controlled thermal input may be further imparted to the gas carrier stream and the entrained particles by preheating a portion of the gas supplied by gas source 74. In this regard, a diverted fraction of the gas supply may be directed through a preheater unit 82 via flow line 84, delivered to cold spray gun 78 via flow line 86, and then mixed with the particle-entrained gas stream within gun 78 prior to or during discharge through nozzle 80.

The AM cold spray process may be utilized to gradually compile at least the body of HX tube 46 on a layer-by-layer basis over removable mandrel 48. Controlled movement nozzle 80 of cold spray gun 78 may be effectuated utilizing any suitable positioning device. For example, as indicated in FIG. 3, an output shaft 88 of an actuator 90 may be joined to cold spray gun 78 in a manner allowing movement of nozzle 80 along a translational axis (represented by double-headed arrow 92), which is substantially parallel to longitudinal axes 47. In other embodiments, cold spray gun 78 may be movable relative to mandrel 48 and HX tube 46 in additional degrees of freedom. In this latter regard, a computer-controlled robotic arm may be utilized to move cold spray gun 78 along three orthogonal axis to deposit the NEA feedstock powder at selected locations and gradually build-up the body of HX tube 46. Movement of cold spray gun 78 will typically be dictated by computer-readable design data of a suitable file type, such as SLA extension-type files. For example, the part design data may assume the form of one or more Computer Aided Design (CAD) files, which may be generated by a part designer utilizing a commercially-available CAD program products. A non-exhaustive list of such commercially-available CAD program products includes TOPSOLID, CATIA, CREO, AUTODESK INVENTOR, SOLIDWORKS, and NX CAD software packages.

In embodiments in which removable mandrel 48 is rotated relative to cold spray gun 78 about axis 47 during cold spray deposition, mandrel rotation may occur concurrently with spray gun movement or may instead be interspersed therewith in, for example, an alternating sequence. In one approach, cold spray gun 78 is continually or periodically moved across the length of removable mandrel 48, while mandrel 48 is continually rotated about axis 47. Such an approach may be particularly useful when, for example, HX tube 46 is imparted with a circular or ovular cross-sectional shape, such as that shown on the bottom right of FIG. 3 for tube end portion 52. In other instances, removable mandrel 48 may be intermittently turned by a set angular displacement or predetermined clocking about axis 47, cold spray gun 78 may be moved or swept lengthwise across mandrel 48 in one or more passes, and then mandrel 48 may again be turned by the set angular displacement. Stated differently, removable mandrel 48 may be initially rotated in a first direction by a predetermined angular displacement to position a first side of mandrel 48 with respect to nozzle 80, cold spray gun 78 may then be moved in a controlled manner to deposit the NEA feedstock powder onto the first side of mandrel 48 utilizing a sweeping motion of nozzle 80 relative to mandrel 48 along axis 47. This process is then repeated, as needed, to compile the elongated tube body over the other sides of mandrel 48. This latter approach may be particularly useful when mandrel 48 has a polygonal cross-sectional geometry, such as that shown for tube end portion 50, which is desirably transferred to the elongated tube body.

The process parameters governing the AM cold spray process utilized to compile HX tube 46 over removable mandrel 48 will vary amongst embodiments. In embodiments in which HX tube 46 is formed by cold spray deposition of an NEA feedstock powder, the peak temperatures to which the NEA feedstock powder is heated are beneficially maintained below $T_{CRITICAL}$ through cold spraying to preserve the desired microstructure of the NEA material. Accordingly, in such embodiments, the cold spray process may be performed such that the NEA feedstock powder is exposed to a maximum processing temperature of $T_{SPRAY\_MAX}$, which is less than $T_{CRITICAL}$ and perhaps at least 50° C. less than $T_{CRITICAL}$. To be clear, preheater unit 82 may heat the gas flow to temperatures exceeding $T_{CRITICAL}$ in certain instances. Should this be the case, however, the temperature of the NEA feedstock powder remains below $T_{CRITICAL}$ as the powder particles are entrained in the carrier stream for an extremely brief time period thereby preventing excessive heat transfer from the carrier gas to the powder particles. Furthermore, gas temperatures may decrease rapidly to levels below $T_{CRITICAL}$ by the time the gas reaches cold spray gun 78 and contacts the feedstock powder. Gas temperature will also generally decrease rapidly upon discharge from nozzle 80 such that the cooling rate at nozzle 80 may approach or exceed the above-mentioned threshold (e.g., $1 \times 10^{6}$° C./s) in embodiments. Regarding the other process parameters of the AM cold spray process (e.g., deposition rates, particle discharge velocities, carrier gas types, chamber environment conditions, and the like), again such parameters will vary amongst embodiments. In one embodiment, helium is utilized as the carrier gas, which is supplied at a pressure approaching or exceeding approximately 700 pounds per square inch to impart the particles with high velocities and relatively straight trajectories when discharged from cold spray gun 78.

When striking the target surface or site-of-deposition, kinetic energy of the particle impact induces plastic deformation of the cold spray-deposited NEA material to create the desired bond between layers of the deposited NEA feedstock powder. A certain degree of thermal input may be reintroduced into the NEA feedstock powder due to the conversion of kinetic energy when contacting the target surface or site-of-deposition. However, this secondary heating mechanism will also typically be insufficient to heat the NEA feedstock powder (or the resulting compacted body composed of the NEA material) to temperatures exceeding $T_{CRITICAL}$. The particles are applied at a temperature well below their melt point such that the kinetic energy of the particles on impact (rather than particle temperature) is the mechanism underlying plastic deformation and bonding of the particle with the target surface. Advantageously, AM cold spray processes are capable of relatively rapid deposition rates often exceeding 1 gram of material per second. As a result, the AM cold spray process carried-out at STEP 26 of method 20 may be capable of producing HX tubes and other heat exchanger components in a highly efficient manner. Furthermore, as each layer of NEA feedstock powder is deposited by cold spray, the newly-applied layer tends to compact and thereby densify the previously-deposited NEA material layers. This, combined with the desirable properties of the NEA feedstock powder, enable the AM cold spray process to fabricate HX tubes having low porosities, which may be less than 1% and, perhaps, less than 0.5% by volume.

Progressing next to STEP 26 of method 20 (FIG. 1), additional post-spray processing steps may be performed prior to, concurrent with, or following mandrel removal. Post-spray processing steps can include heat treatment of the newly-formed HX tube 46 for annealing or stress relief purposes. For example, in embodiments in which the cold spray-deposited material is composed of an NEA material, a post-spray annealing process may be performed during STEP 26 as follows. HX tube 46 (and any additional HX tubes produced during STEP 26) may be placed in a furnace and heated to a maximum anneal temperature ($T_{ANNEAL\_MAX}$) for a predetermined period of time on the order of, for example, an hour. Care may be taken to ensure that $T_{ANNEAL\_MAX}$ is maintained at a value below $T_{CRITICAL}$ during the post-spray annealing process; e.g., in an embodiment in which $T_{CRITICAL}$ ranges from about 400° C. to about 450° C., the post-spray annealing process may be controlled such that $T_{ANNEAL\_MAX}$ is less $T_{CRITICAL}$ and ranges from about 350° C. to about 400° C. In other embodiments, the post-spray annealing process is controlled such $T_{ANNEAL}$ is greater than ½ $T_{CRITICAL}$ and less than $T_{CRITICAL}$. Such a post-spray annealing process can be performed to reduce the compression stress within the NEA material of HX tube 46 resulting from the cold spray process.

Figure 4:
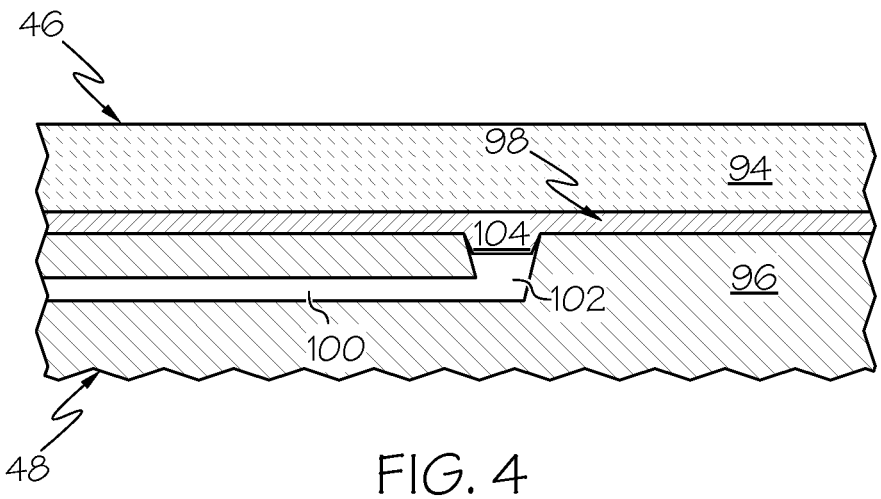
FIGS. 4-6 illustrate, in simplified cross-section, a limited region of an exemplary HX tube formed over a removable mandrel, as illustrated during various stages of the method set-forth in FIG. 1.
Figure 5:
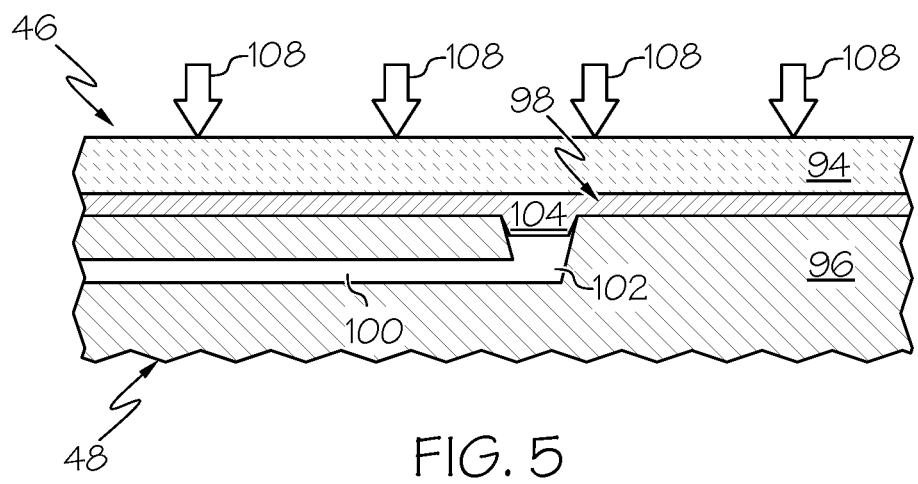

In addition to or in lieu of post-spray annealing, HX tube 46 may be machined prior to or after mandrel removal during STEP 26 of method 20. Machining may define the more detailed structural features or physical intricacies of HX tube 46 and/or to impart HX tube 46 (and any other tubes produced during STEP 26) with a desired surface finish. Additionally, if desired, the elongated tube body of HX tube 46 can be deposited to excess thickness during the cold spray process for enhanced densification, with the excess thickness or overburden subsequently removed by post-spray machining. For example, in this case, HX tube 46 may be deposited to an excessive wall thickness and subsequently machined (e.g., by turning, polishing, lapping, or the like) to bring the wall thickness into conformance with the target dimensions of HX tube 46. This possibility is illustrated in FIGS. 4 and 5, which are cross-sectional views of relatively limited regions of HX tube 46 and removable mandrel 48. A portion of tube wall 94 is deposited over illustrated portion 96 of removable mandrel 48. An intervening coating or layer 98 (hereafter, "sacrificial release layer 98") is further formed over mandrel 48 prior to spray deposition of HX tube 46 to facilitate subsequent mandrel removal. As may be appreciated by comparing FIG. 4 to FIG. 5, tube wall 94 of HX tube 46 is deposited to an excess thickness to obtain the desired densification with the resulting porosity of HX tube 46 being relatively low; e.g., in an embodiment, HX tube 46 may have a porosity of less than 1% by volume. As indicated by arrows 108 in FIG. 5, HX tube 46 is then subjected to a material removal process to impart tube wall 94 with its desired final thickness.

Next, at STEP 28 of method 20, mandrel removal or separation is carried-out. Many approaches can be utilized, alone and in combination, to facilitate separation of mandrel 48 from HX tube 46. In one useful approach, a low friction release finish may be formed over the outer surface of removable mandrel 48, and HX tube 46 may then be deposited onto the low friction release finish. A solid film lubricant layer can be utilized for this purpose, such as carbon or boron nitride (BN) films. To provide a more specific example, a plated metal (e.g., electroless Ni) loaded with a solid film lubricant particles, such as hexagonal boron nitride (hBN) or Polytetrafluoroethylene (PTFE) particles, may be utilized as a mandrel release layer and formed over the surfaces on mandrel 48 onto which the HX tube material is deposited during the AM cold spray process. The usage of such plated metal materials and low friction release finishes, generally, can provide extremely low coefficients of friction to facilitate mandrel removal during STEP 28. Furthermore, such materials may have a relatively high thermal tolerances; e.g., in the case of hBN-loaded electroless Ni, temperature tolerances may approach or exceed about 680° C. Additionally, when electroless plating is utilized, the release layer can be imparted with a highly uniform thickness.

In other embodiments, the shape of mandrel 48 can be altered in some manner, such as by physical collapse, to facilitate mandrel removal during STEP 28 of method 20. Alternatively, the mandrel can gave an inflatable design and be deflated to facilitate removal. In yet other implementations, removable mandrel 48 can be composed of a microporous material, in whole or in part, through which a pressurized fluid can be passed to support mandrel removal. In this case, during STEP 28, pressurized airflow or another pressurized fluid (liquid or gas) may then be forced through the porous structure of removable mandrel 48 help release the mandrel. CTE mismatch techniques can be utilized to assist with mandrel removal, which facilitate mandrel separation from spray-deposited HX tube 46 upon adequate cooling or heating of the tube and mandrel. The above-described post-spray annealing process can potentially be carried-out in concert with mandrel removal via CTE mismatch when involving elevated temperatures in the appropriate range.

Figure 6:
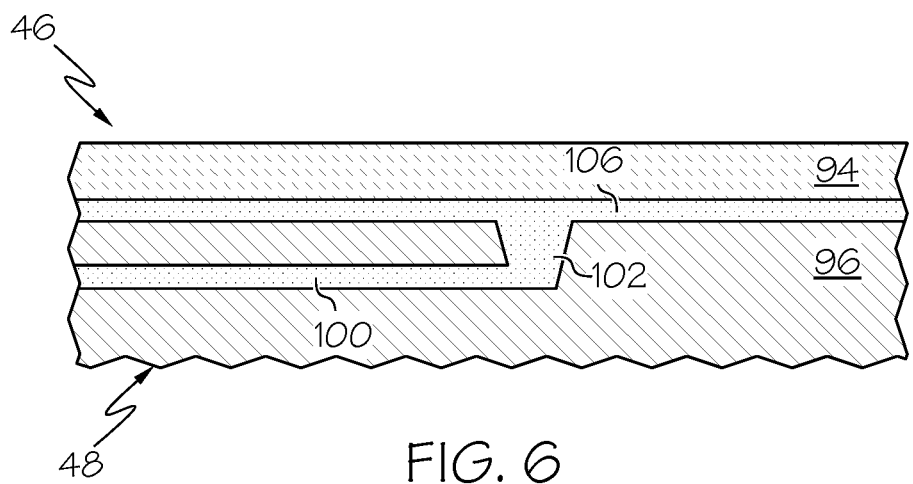

In further embodiments, selectively-etchable or chemically-dissolvable layers, such as a water-dissolvable glass material, can be utilized to facilitate mandrel release during STEP 28 of method 20. One possible technique for assisting with mandrel removal through the usage of a chemically-dissolvable layer is illustrated in FIG. 6. Referring to this figure in conjunction with FIGS. 4 and 5, a sacrificial release layer 98 may be formed over mandrel portion 96 and mandrel 48. The sacrificial release layer may be formulated for a high preferential etch rate during subsequent dissolution via treatment with a suitable etchant. To accelerate layer dissolution, removable mandrel 48 may be imparted with solvent-receiving flow channels 100 including outlets 102. Sacrificial release layer 98 may be deposited over the out surface of mandrel 48 to include plug portions 104. Plug portions 104 temporarily block outlets 102 and thereby present a substantially smooth, uninterrupted surface for subsequent spray-deposition of HX tube 46. After the cold spray deposition is completed, a liquid or gaseous etchant 106 (FIG. 6) may be introduced into flow channels 100 to initially dissolve plug portions 104. The etchant may then dissolve the remainder of sacrificial release layer 98 to allow removal of mandrel 48 from within HX tube 46. In other embodiments, a similar approach can be utilized, but with a pressurized fluid (airflow or another gas) directed through channels to facilitate mandrel removal. Dissolution of sacrificial release layer 98 can also be accomplished absent of flow channels 100 in further embodiments by, for example, submerging HX tube 46 and mandrel 48 in a chemical bath following the above-described cold spray-deposition process.

Figure 7:
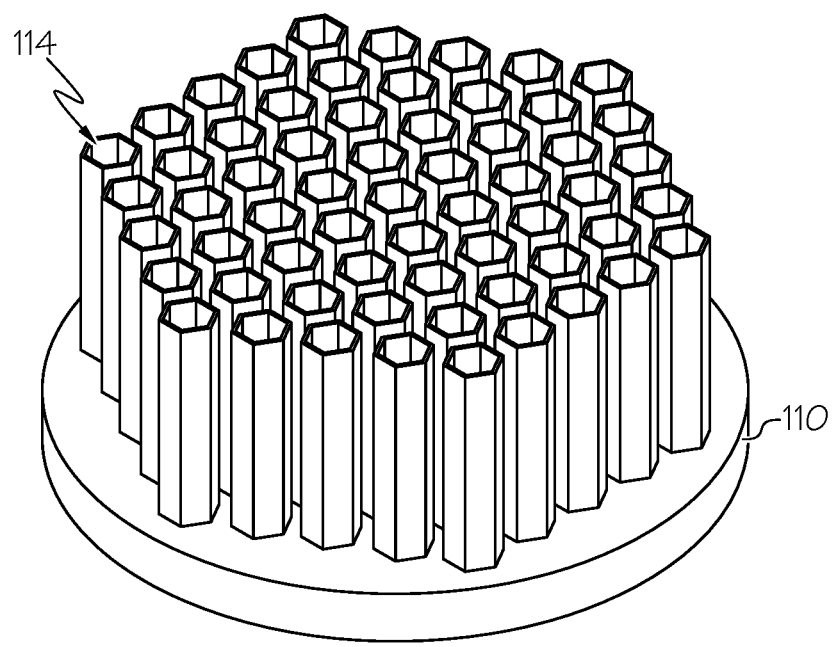
FIG. 7 is an isometric view of a tube-header assembly containing an array of HX tubes joined to a header structure, such as a manifold plate or tubesheet, in accordance with embodiments of the method of FIG. 1.

STEPS 24, 26, 28 can be performed repeatedly or iteratively, as desired, to produce any desired number of HX tubes similar or identical to HX tube 46 (FIGS. 3-7). Afterwards, method 20 advances to STEP 30 during which the recently-produced HX tubes 46 are installed in a heat exchanger. This may involve joinder of the HX tubes to some form of static infrastructure, which is generically referred to herein as a "header structure." The particular form assumed by the header structure and, more generally, the heat exchanger will vary amongst embodiments. However, to provide a non-limiting example, an example of such a header structure 110 is shown in FIG. 7. So too is an example of a shell-and-tube heat exchanger 112 containing header structure 110 illustrated in FIG. 8, with heat exchanger 112 shown in partial cutaway. Heat exchanger 112 and header structure 110 are described below, with the understanding that the following description is provided by way of non-limiting example and HX tubes 46 can be installed in various other types of heat exchangers.

Figure 8:
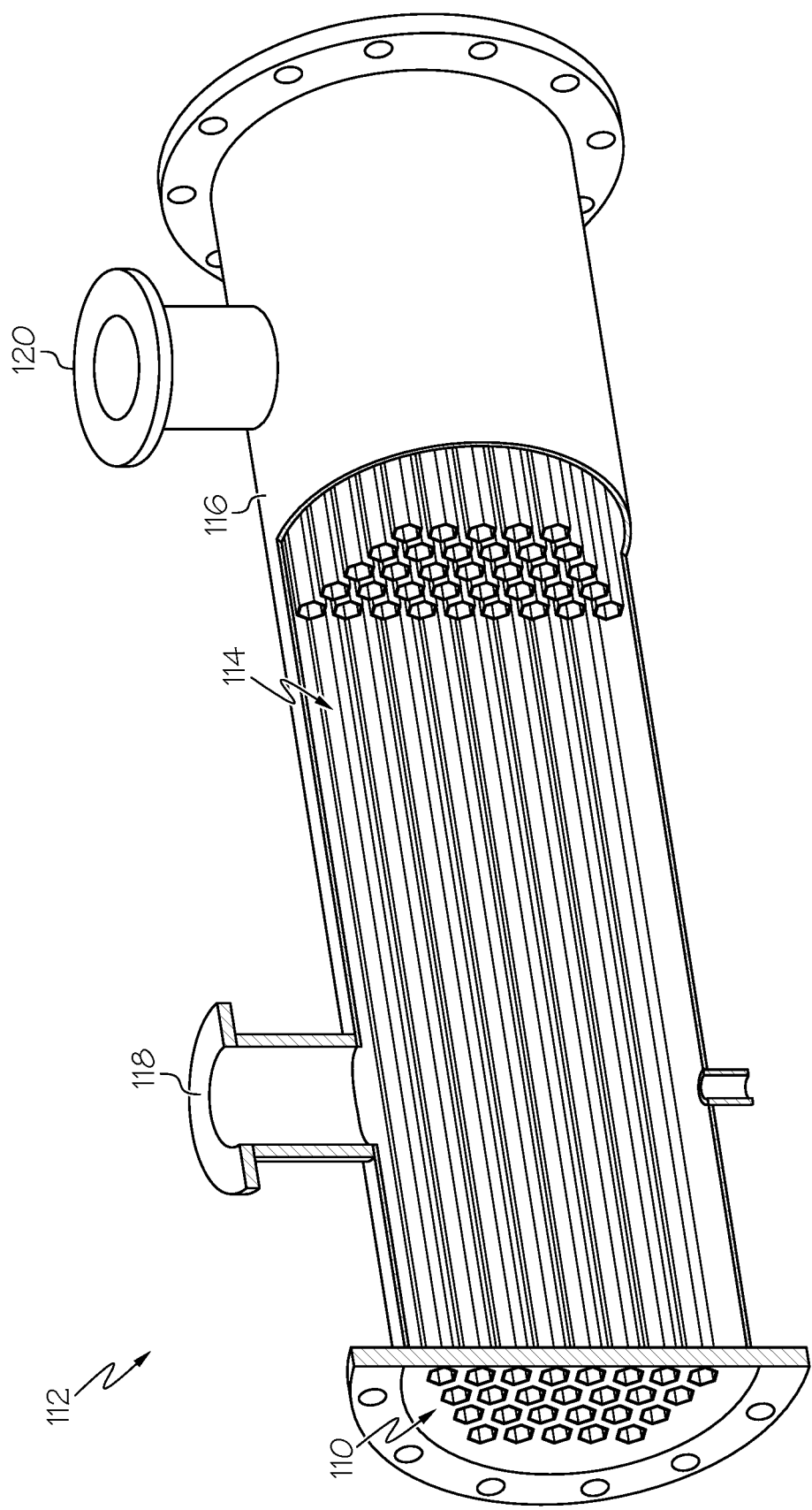
FIG. 8 is an isometric view of a shell-and-tube heat exchanger, shown in partial cutaway, containing the tube-header assembly of FIG. 7 in accordance with an exemplary implementation of the method of FIG. 1.

Referring jointly to FIGS. 7-8, an array of tubes 114 is joined to header structure 110. In this particular example, header structure 110 assumes the form of a manifold plate or tubesheet. In this particular example, heat exchanger 112 is a shell-and-tube heat exchange and includes a shell 116 having an inlet 118 and an outlet 102 through which a liquid or gaseous coolant may be conducted during heat exchanger operation. Concurrently, the temperature-regulated fluid is conducted from header structure 110, through tube array 114, and to another header structure (hidden from view in FIG. 8) before discharge from heat exchanger 112. Heat is thus removed from the temperature-regulated fluid, thermally conducted through the walls of HX tubes in array 114, and ultimately transferred to the coolant fluid circulated through shell 116 and impinging upon the exteriors of the HX tubes forming array 114. In alternative embodiments, other types of fluid can be circulated through heat exchanger 112; or the above-described thermal transfer relationship can be reversed such that the temperature-regulated fluid is heated as the fluid passes through heat exchanger 112.

Depending upon heat exchanger design and usage, fluid-tight seals may or may not be desirably formed at the interfaces between the HX tubes in tube array 114, header structure 110, and the other non-illustrated header structure within heat exchanger 112 (FIG. 8). For example, in implementations in which heat exchanger 112 is utilized to cool core airflow (the temperature-regulated fluid) by transfer of heat to secondary airflow, as is the case for certain heat exchangers utilized within Gas Turbine Engines (GTEs), minimal amounts of leakage at the tube-header interfaces may be tolerable as only a modest performance penalty results. In other embodiments, such as when the heat exchanger is utilized to cool oil flow (the temperature-regulated fluid), fluid leakage across the tube-to-header interfaces may be unacceptable. It is thus often desirable to form a mechanical and, perhaps, a fluid-tight joint at the tube-header interfaces. In embodiments in which the HX tubes are composed of a non-NEA material, careful regulation of heat exposure during joinder of the HX tubes to the header structure may not be required. In this instance, welding, brazing, or other such higher temperature joinder techniques can be employed. However, in embodiments in which the tube bodies are formed from an NEA material, heat input may be desirably limited during the tube joinder process to preserve the desired microstructure of the NEA material and thereby optimize the mechanical properties of the HX tubes forming array 114, as previously described.

Figure 9:
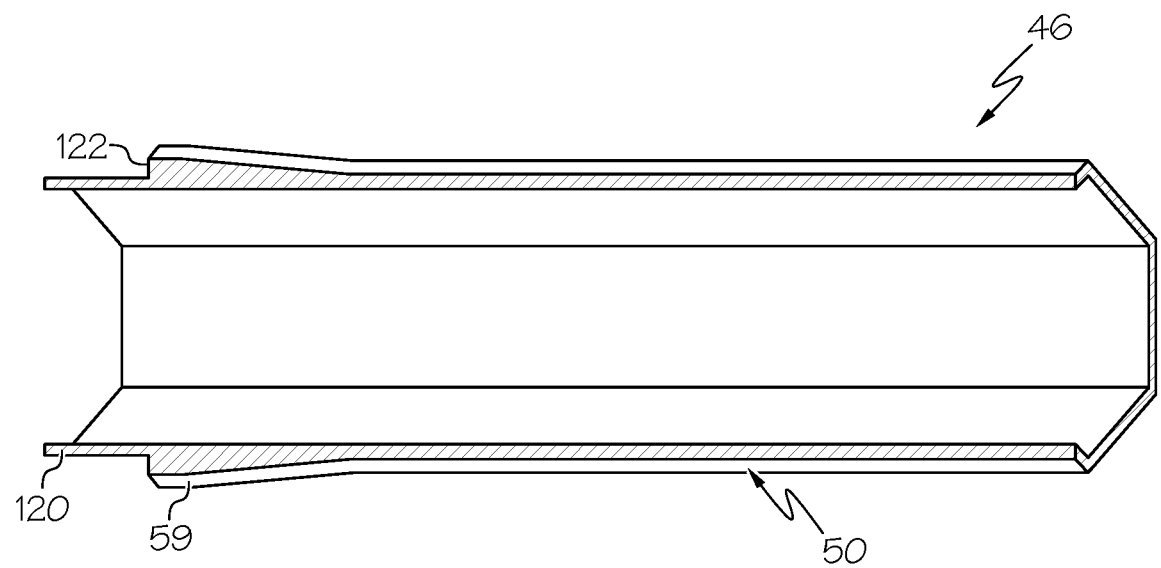
FIGS. 9 and 10 are isometric and cross-sectional views, respectively, of a terminal end portion of an exemplary HX tube, which may be produced to have variable wall thicknesses to facilitate mechanical attachment to a header structure accordance the method set-forth in FIG. 1.
Figure 10:
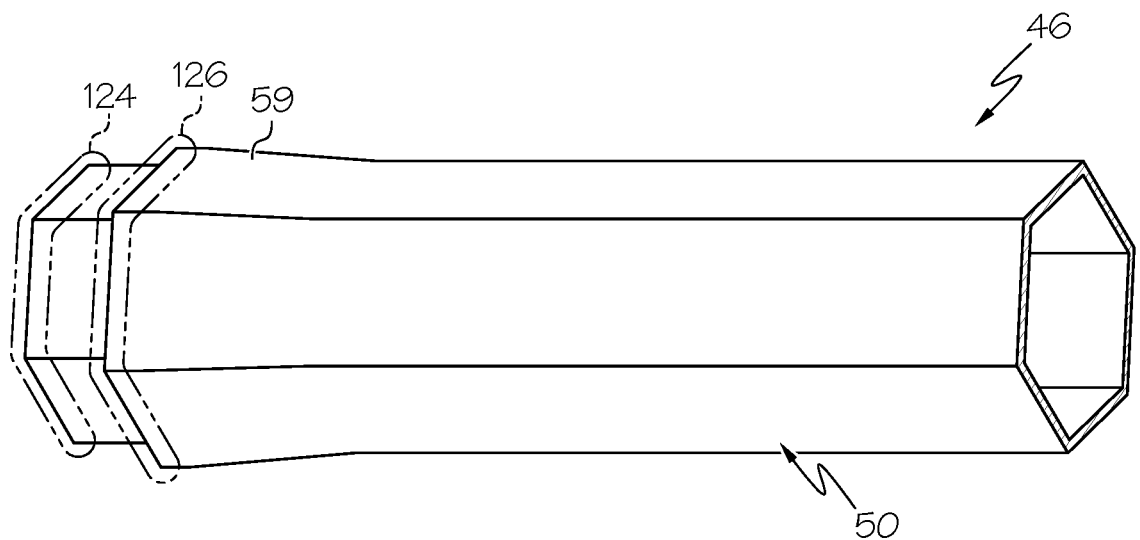

Turning lastly to FIGS. 9 and 10, there is shown an end portion 50 of HX tube 46 in cross-sectional and isometric views, respectively. As can be seen, the wall thickness of end portion 50 of HX tube 46 increases gradually when moving toward the terminal end of HX tube 46 from a central portion thereof (to the left in FIG. 9). Additionally, HX tube 46 is fabricated to contain a terminal thin-walled tube section 120, which transitions from the maximal wall thickness in a stepped fashion to define an annular ledge 122. At least two advantages may realized by imparting HX tube 46 with such structural features. First, annular ledge 122 may function as a registration or piloting feature, which abuts header structure 110 when HX tube 46 to ensure proper spatial alignment between mating components. Second, thin-walled tube section 120 may be amenable to subsequent deformation or physical reshaping during assembly to, for example, provide a mechanical locking effect with structure header 110 and/or to provide a fluid-tight seal at this interface. Such mechanical deformation may be carried-out at relatively low (e.g., room) processing temperatures utilizing crimping, roll expansion, or other controlled shaping process. In this manner, joint formation may be accomplished without reliance upon conventional high temperature joint formation processes, such as brazing or welding, which risk exposing the NEA material to peak temperatures exceeding $T_{CRITICAL}$.

If desired, the cold spray deposition process may further be carried-out to additionally produce circumferential joints at selected tube-header or, more generally, tube-infrastructure interfaces. This is further indicated in FIG. 10 by dashed circles 124, 126, which generally denote the regions of HX tube 46 around which the cold spray-deposited alloy powder may be deposited to create such circumferential joints in embodiments. In certain implementations of method 20, the same or similar NEA powder feedstock material utilized to produce HX tube 46 may be utilized to form the cold spray-deposited joints in this manner. In other embodiments, a different powdered alloy can be utilized, whether or not composed of an NEA material. Such a cold spray deposition process for forming fluid-tight joints at the interfaces between HX tube 46 and a header structure (e.g., header structure 110 shown in FIGS. 7 and 8) can be utilized in combination with mechanical joinder techniques, such as deformation of thin-walled tube section 120, to minimize the mechanical loads placed on the cold spray-deposited joints during subsequent heat exchanger operation. Fluid-tight joints can thus be created in an efficient manner, while limiting temperatures and structural stress imparted to HX tube 46 and the other HX tubes contained within a given heat exchanger. Again, this may be particularly desirable when the HX tubes are composed, in whole or in part, of an NEA material deposited utilizing an AM cold spray process of the type described herein.

CONCLUSION

The foregoing has thus provided various methods for the production of HX tubes and, more generally, heat exchangers having enhanced performance properties. The above-described methods utilize specialized AM cold spray processes to fabricate the HX tubes from selected alloys including, for example, NEA feedstock powders of the type described above. Notably, when utilized, such NEA feedstock powders can improve heat exchanger temperature capabilities and other properties when tailored to contain certain metastable microstructures, providing that such microstructures are adequately preserved through subsequent processing stages. Additional benefits potentially realized are exceptionally lightweight heat exchanger constructions, as well as enhanced oxidation and corrosion resistance. Regardless of whether the HX tubes are produced in part or in whole from NEA feedstock powders, specifically, an additive cold spray deposition process is employed to build-up the tube bodies from a powdered cold spray feedstock material. Fabrication of the HX tubes can thus be achieved utilizing relatively low cost, efficient manufacturing processes affording a high level of flexibility in heat exchanger design.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:
1. A method for producing a heat exchanger (HX) tube having an elongated tube body, the method comprising:
providing a sacrificial release layer formed on a mandrel;

producing at least the elongated tube body of the HX tube by depositing a feedstock powder over the mandrel utilizing a cold spray process; and after producing, removing the HX tube from the mandrel by dissolving the sacrificial release layer to release the HX tube from the mandrel.

2. The method of claim 1 further comprising selecting the feedstock powder to comprise a Non-Equilibrium Alloy (NEA) predominately composed of aluminum, by weight.

3. The method of claim 2 wherein the NEA feedstock powder comprises an alloy matrix throughout which a first minority constituent is dispersed, the first minority constituent precipitating from the alloy matrix when the NEA feedstock powder is exposed to temperatures exceeding a critical temperature threshold ($T_{CRITICAL}$) for a predetermined time period;

wherein the HX tube is exposed to a maximum temperature ($T_{SPRAY\_MAX}$) during the cold spray process; and wherein $T_{SPRAY\_MAX}$ is maintained below $T_{CRITICAL}$ to preserve a non-equilibrium state of the NEA feedstock powder through the cold spray process.

4. The method of claim 3 wherein $T_{CRITICAL}$ is less than a melt point of the NEA feedstock powder and greater than 300 degrees Celsius.

5. The method of claim 2 further comprising selecting the NEA feedstock powder to contain, by weight percent:
between 85 and 90 aluminum;
between 8 and 10 percent iron;
between 1 and 3 percent silicon; and
between 1 and 2 percent vanadium.

6. The method of claim 1 further comprising selecting at least a portion of the mandrel to have a polygonal cross-sectional geometry, as taken in a section plan orthogonal to a longitudinal axis of the mandrel, the polygonal cross-sectional geometry transferred to at least a portion of the elongated tube body spray-deposited onto the outer surfaces of the mandrel.

7. The method of claim 1 further comprising controlling the cold spray process to impart the elongated tube body with an increasing wall thickness when moving toward a terminal end portion of the first MIX tube.

8. The method of claim 2 wherein utilizing a cold spray process further comprises:
rotating the mandrel in a first direction by a predetermined angular displacement to position a first side of the mandrel with respect to a nozzle of a cold spray apparatus utilized to deposit the elongated tube body;
after rotating the mandrel, depositing the NEA feedstock powder onto the first side of the mandrel utilizing a sweeping motion during which the nozzle of the cold spray apparatus is moved with respect to the mandrel along the longitudinal axis thereof; and
repeating the steps of rotating and depositing to build-up the elongated tube body over the mandrel.

9. The method of claim 3, wherein after utilizing the cold spray process, heat treating the HX tube utilizing an annealing process having a maximum anneal temperature ($T_{ANNEAL\_MAX}$) less than $T_{CRITICAL}$.

10. The method of claim 1 wherein the dissolving the sacrificial release layer further comprises submerging the HX tube and the mandrel in a chemical bath.

11. A method for producing a heat exchanger (HX) tube having an elongated tube body, the method comprising:
providing a mandrel with a sacrificial release layer, the mandrel including a solvent-receiving flow channel and the sacrificial release layer including a plug portion that blocks an outlet of the solvent-receiving flow channel;
producing at least the elongated tube body of the HX tube by depositing a feedstock powder over the mandrel utilizing a cold spray process; and
after producing, removing the HX tube from the mandrel by introducing an etchant into the solvent-receiving flow channel to dissolve the plug portion and a remainder of the sacrificial release layer.

\* \* \* \* \*